(12) United States Patent
Lühmann et al.

(10) Patent No.: US 6,680,096 B1
(45) Date of Patent: Jan. 20, 2004

(54) ADHESIVE FILM STRIP AND ITS USE

(75) Inventors: Bernd Lühmann, Norderstedt (DE); Andreas Junghans, Hamburg (DE); Achim Franck, Lübeck (DE)

(73) Assignee: tesa AG, Hamburg (DE)

( * ) Notice: Subject to any disclaimer, the term of this patent is extended or adjusted under 35 U.S.C. 154(b) by 371 days.

(21) Appl. No.: 09/637,074

(22) Filed: Aug. 11, 2000

(30) Foreign Application Priority Data

Aug. 14, 1999 (DE) .......................................... 199 38 693

(51) Int. Cl.[7] .................................................. C09J 7/02
(52) U.S. Cl. ..................... 428/40.1; 428/41.7; 428/42.1; 428/42.2; 428/192; 428/194; 428/201; 428/212; 428/214; 428/220
(58) Field of Search ............................... 428/40.1, 41.7, 428/42.1, 422, 192, 194, 201, 212, 214, 220

(56) References Cited

U.S. PATENT DOCUMENTS 5,626,931 A * 5/1997 Luhmann ................. 428/40.1

FOREIGN PATENT DOCUMENTS

| DE | 44 28 587 A1 | 2/1996 |
|---|---|---|
| EP | 0 987 309 A2 | 3/2000 |

* cited by examiner

Primary Examiner—Nasser Ahmad
(74) Attorney, Agent, or Firm—Norris McLaughlin & Marcus (57) ABSTRACT

An adhesive film strip for an adhesive bond which can be separated again by pulling on the strip in the direction of the bond plane, the adhesive film strip comprising upper and lower surfaces; first and second ends, wherein the first end serves as a tab for pulling and the second end terminating in at least one point; and an adhesive region extending from the first end toward the second end, wherein the adhesive region comprises a first adhesive region adjacent to the tab, a second adhesive region adjacent to the first adhesive region, wherein the second adhesive region has a cross-sectional area that is sharply reduced relative to the cross-sectional area of the first adhesive region, and a third adhesive region adjacent to the second adhesive region extending and forming the second end.

15 Claims, 1 Drawing Sheet

ADHESIVE FILM STRIP AND ITS USE

The invention relates to an adhesive film strip and to its use; the invention relates in particular to a strippable, high-peel-strength, adhesive film strip having a first adhesive film strip region of high cross-sectional area, preferably realized by means of a large adhesive strip width, and adjacent to this first adhesive film strip region a second adhesive film strip region with strong spontaneous tapering of the adhesive film cross-sectional area, in association with one or more adhesive film strip ends which run to a point, the said strip featuring only very low transfer to a bonded article of the energy stored elastically in the adhesive film strip in the course of the detachment process, and so, at the end of the detachment process, in the case of double-sidedly adhesive film strips, causing no significant catapulting of the assembly comprising one of the bonded articles and the adhesive film strip, even when one of the two articles bonded to one another is not fixed during the detachment process. At the same time, the adhesive film strip in the invention features a significantly reduced drop in the energy stored elastically in it at the end of the detachment process.

INTRODUCTION/PRIOR ART

The invention relates to a high-peel-strength, double-sided adhesive film strip for a bond redetachable without residue or destruction, the said strip being removable from a joint by stretching extending essentially in the bond plane such that the debonding of the two adherends proceeds very substantially simultaneously and, at the end of the detachment process, there is no significant catapulting of the assembly comprising one of the bonded articles with the adhesive strip. At the same time, the adhesive film strip of the invention features only a very slight drop in the elastic energy stored in it during the detachment process.

The invention further relates to a high-peel-strength, single-sided adhesive film strip for a bond redetachable without residue or destruction, the said strip being detachable by stretching extending essentially in the bond plane such that at the end of the detachment process there is only a very slight drop in the energy stored elastically in the said strip, as a result of which there is only a very low transfer to the bonded article of the energy stored elastically in the adhesive strip during the detachment process.

Highly elastically or plastically extensible (strippable) self-adhesive tapes which are redetachable without residue or destruction by stretching extending essentially in the bond plane are known from U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729 and DE 197 08 366.

They are frequently used in the form of single- or double-sided adhesive film strips (adhesive tape strips, adhesive strips), which preferably have a nonadhesive grip-tab region from which the detachment process is initiated. Particular applications of such self-adhesive tapes may be found, inter alia, in DE 42 33 872, DE 195 11 288, U.S. Pat. Nos. 5,507,464, 5,672,402 and WO 94/21157. Specific embodiments are described, for example, in DE 44 28 587, DE 44 31 914, WO 97/07172, DE 196 27 400, WO 98/03601 and DE 196 49 636.

A highly advantageous quality criterion of abovementioned strippable adhesive film strips is their capacity to develop a reduced adhesion under stretching, including that involved in the detachment process, as a result of which the friction of the adhesive strips on the edges of the adherends, and thus the mechanical load on the adhesive strips in these potential contact regions, when corresponding double-sided adhesive film strips are removed from the joint, are low. An essential factor, especially for the redetachable bonding of rigid adherends, is a reduction in the thickness of the adhesive film strip during detachment, which is the primary prerequisite for the ability to remove double-sided adhesive tapes from a joint.

The realization of strippable self-adhesive tapes which on the one hand have high peel strength by virtue of a large adhesive-strip width and on the other hand may be reliably redetached without residue, destruction or tearing in all cases, even from very sensitive substrates, is a complex undertaking and requires further preconditions. With regard to redetachment without residue, destruction or tearing, DE 44 31 914 and DE 196 49 636 address in particular the problem of tears in the grip-tab region and, respectively, in the adhesive-strip region directly adjacent to the grip-tab region. DE 44 28 587 describes an adhesive film strip for a rereleasable bond removable from a joint by pulling in the direction of the bond plane, characterized in that the bond area decreases towards the end of the adhesive film strip (the end which disappears in the joint) (see claim 1). DE 44 28 587 describes pointed, zigzag, convexly curved, and corrugated adhesive film strip ends. Essential in each case is a reduction in the bond area at the end of the adhesive strip (column 1, lines 63 and 64). Correspondingly shaped adhesive film strips, in comparison to adhesive film strips whose bond area does not decrease at the end, exhibit a significantly reduced tendency to tear in the end region of the adhesive strips. At the same time, there is a marked reduction in instances of substrate damage, so that even very sensitive substrates may be reversibly bonded with such adhesive film strips.

A further problem may be the transfer to an adherend of the energy stored elastically during the stripping process in the adhesive strip which it is intended to detach. In the case of double-sided adhesive film strips, there may be catapulting of the assembly comprising adhesive strip for detachment and one of the bonded articles, and this catapulting may cause not inconsiderable damage. Furthermore, the spontaneous elastic release of, in particular, highly elastic strippable self-adhesive tapes at the end of the stripping process (viz, at the end of the detachment process, the drop in the energy stored elastically in the adhesive strip during the detachment process) may result in the adhesive tape snapping back against the fingers, which may have very painful consequences.

WO 97/07172 addresses the specific problems of the catapulting of articles bonded with strippable double-sided self-adhesive tapes and of the spontaneous snap-back of aforementioned self-adhesive tapes from the joint at the end of the detachment process. Catapulting of bonded articles may occur when, at the end of the detachment process, the adhesive strip for detachment has separated only from one of the adherends, e.g. the wall, and the second adherend is not adequately fixed. The energy elastically stored in the self-adhesive strip in the course of its stretching then causes the assembly comprising adhesive strip and the unfixed article, still bonded to the adhesive film strip, to catapult in the direction of detachment. The solution described by WO 97/07172 is a strippable self-adhesive strip which on one adhesive surface at the end of the adhesive strip has a region of no adhesion or else significantly reduced adhesion (differential adhesive strip end). If this self-adhesive strip surface is directed towards the bonded article, then when the adhesive strip is detached there is first of all complete separation of the adhesive strip from the bonded article, so that the latter is detached from the bond substrate and can be removed therefrom, and on further stretching of the self-adhesive tape the same then detaches from the second substrate, e.g. the wall. Aforementioned adhesive strips therefore permit controllable sequential detachment of an adhesive bond. The thus-controlled sequential detachment process likewise reduces the snap-back of the adhesive film strip from the joint by virtue of the absence of one adherend (which has in fact already undergone detachment).

Without a non-adhesive or significantly adhesion-reduced end region, the detachment sequence of two bonded articles is normally not easy to control. Rather it is observed, for example in the case of a poster affixed to a wall with a strippable self-adhesive tape not designed in accordance with WO 97/07172, unless fixed during the detachment process, that at the end of the detachment process the poster is accelerated together with the adhesive strip in catapult fashion in the detachment direction. In this case, therefore, there is first of all complete detachment of the self-adhesive tape from the wall; in the instant of complete detachment of the adhesive strip from the wall, the strip has not yet separated fully from the poster. Subsequently, the energy stored elastically in the strip during its stretching process results in the catapulting of the bonded article, in this case the poster, in the detachment direction. Sensitive materials in particular, such as posters, for example, which use very thin papers of low tear strength, may thus easily be damaged during the detachment process. Owing to the catapult-type acceleration at the end of the detachment process and subsequent collision with another article, solid materials may be damaged or cause damage to the said article. In particular, the impact on the fingers of bonded articles accelerated in catapult fashion may be very painful and may also cause injury. Although sensitive flexible materials, such as posters, for example, are pressed firmly onto the bond substrate, the region between the adhesive strip for detachment and the point at which the poster is pressed onto the bond substrate is not tautly fixed (in other words, if the poster paper forms, for example, a wavelike bulge between the region in which it is fixed on the substrate with the adhesive film strip and the point at which it is pressed onto the substrate using, for example, the hand), with low-strength poster papers a very frequent occurrence is tearing at the end of the detachment process, since at the end of the detachment process the poster with the adhesive strip may initially be accelerated in the detachment direction but then, after a short acceleration path, is suddenly stopped, and so undergoes very high negative acceleration, which may lead to the tearing of the poster paper. Although the catapulting of articles fastened with strippable self-adhesive strips may be reliably avoided by taut fixing thereof during the detachment process, it is found in practice that inexperienced users in particular, and children as well, do not always perform such fixing, frequently with corresponding damage to the bonded articles or to the user themselves.

Although for numerous product structures comprising double-sided strippable self-adhesive tapes, the measures described in WO 97/07172 afford effective protection against the specific problem of the catapulting of bonded articles, there are numerous problems that remain unsolved or new problems which arise as a result of the specific product structure required:

1. A not inconsiderable effort is required to equip adhesive strips such that they possess a differential adhesive strip end.
2. The main problem, however, is that the user of such self-adhesive strips is required to apply them with the correct assignment of the adhesive faces to the adherends. Consequently, the correct usage of the self-adhesive strips requires not only that the orientation of the grip tab be performed correctly but also that the correct self-adhesive strip surface, i.e. that with the non-adhesive or adhesion-reduced end region, is directed towards the bonded article. Especially when bonding two or more similar articles to one another, the advantage of sequential detachment can seldom be exploited in practice, since the user can hardly be expected to recall which side of the self-adhesive strip is on which adherend.
3. If the article for removal is not fixed during detachment of the strippable self-adhesive strip, further problems arise. In the case of incorrect orientation of the adhesive strip provided with a differential adhesive strip end, the catapulting of an article fixed, for example, on a wall is manifested to an even greater extent: in the instant of detachment of the adhesive strip from the wall, the entire stripping force is transferred in each case to the fixed object, which may lead to a very severe catapult effect.

As remarked above, DE 44 28 587 describes adhesive film strips for a redetachable bond removable from a joint by pulling in the direction of the bond plane. The essential factor in each case is a reduction in the bond area at the end of the adhesive strip (column 1, lines 63 and 64). DE 44 28 587 describes pointed, zigzag, convexly curved, and corrugated adhesive film strip ends. The problems of the catapulting of bonded articles and of the spontaneous snap-back of strippable adhesive strips at the end of the detachment process are not addressed in DE 44 28 587. Nor are they reliably excluded by the measures proposed. Similarly, DE 44 28 587 gives no indications as to how, at the end of the detachment process, a very small drop in the elastic energy stored in the adhesive strips in the course of extensive detachment may be realized.

Objective

The aim of the present invention was to specify a double-sided self-adhesive strip which has a high peel strength, by virtue of substantially simultaneous detachment of both adherends features no significant catapulting of bonded articles at the end of the detachment process, even when one of the bonded articles is not fixed during the detachment process, by virtue of its product structure requires no particular allocation of the adhesive strip sides to the adherends, and thus does not necessitate separate asymmetric treatment by means of a non-adhesive end region, and at the end of the detachment process features only a very small drop in the energy stored elastically in the adhesive strip in the course of its extensive detachment.

A further aim of the present invention was to provide a single-sided self-adhesive strip which by virtue of its special shape has a high peel strength, at the end of the detachment process, features only very low transfer to the bonded article of the energy stored in the adhesive strip during detachment, and at the end of the detachment process, causes only a very low drop in the energy stored elastically in the adhesive strip in the course of its extensive detachment.

Achievement of the Objectives

The above is achieved surprisingly by means of a self-adhesive strip which in practical use under virtually all application conditions features a high rate of detachment at the end of the detachment process. Rapid detachment by the user is of course promoted by the realization of low stripping forces, which is possible, for example, by means of low adhesive-strip thicknesses or low adhesive-strip widths and/or widths of the adhesive regions, measures which, however, in respect of the tensile strength required for reliable detachment (in the case of very thin adhesive strips) or in a limited bond area (in the case of very narrow adhesive strips or very narrow adhesive regions) are manifested in a disadvantageous manner. It has now been found that very high peel strengths are achieved and, likewise, that very high detachment rates in the end region of the adhesive strips are realized by means of adhesive strip shapes comprising a first pressure-sensitive adhesive region, adjacent for example to the optional adhesive-strip grip tab present, the said pressure-sensitive adhesive region being of comparatively high cross-sectional area (realized, for example, by means of a large width and thickness of the adhesive strip), adjacent to which there is a second adhesive strip region of highly decreasing or tapering cross-sectional area (realized, for example, by means of a pressure-sensitive adhesive region which tapers greatly in width), which opens at the end of the adhesive strip into one or more adhesive-strip ends which run to a point. Essential to high peel strengths is the adhesive-strip width in the abovementioned first adhesive-strip region of high cross-sectional area; essential to high detachment rates at the end of the detachment process is a comparatively high detachment force (stripping force) in the first abovementioned pressure-sensitive adhesive-strip region (the user has to pull forcefully in order to remove the adhesive strip from the joint), which force then drops significantly within a short distance in the second abovementioned adhesive-strip region, so that the detachment process is continued at a sharply accelerated rate. Essential to a small drop in the energy stored elastically in the adhesive strip during the detachment process is the adhesive-strip end which converges in one or more points.

Preferred adhesive-strip shapes feature a first region of high cross-sectional area of the adhesive strip regions, which is preferably realized by way of a high adhesive-strip width. Preferred adhesive-strip widths in this first adhesive-strip region are between approximately 8 mm and approximately 30 mm, with particular preference between approximately 10 mm and approximately 25 mm. Preferred stripping forces in the first adhesive-strip region are on average greater than approximately 5 N, with particular preference greater than 10 N (stripping force measured for white typewriter paper {basis weight: 80 g/m$^2$} bonded to coated woodchip wallpaper; see under Test Methods). Adjacent to the first adhesive-strip region of high cross-sectional area, preferably realized by means of a high adhesive-strip width, there is a second adhesive-strip region in which the cross-sectional area of the adhesive strip regions reduces significantly within a short distance. Preferably, a reduction is achieved in the adhesive-strip cross-sectional area by more than approximately 60%, with particular preference more than 75%, within an adhesive-strip length of less than approximately 50% of the adhesive-strip width at the end of the first adhesive-strip region, preferably of less than 35% of the adhesive-strip width at the end of the first adhesive-strip region. Adhesive-strip ends are shaped so as to run out to a point. One or more adhesive-strip ends which run out to a point are possible. Within the adhesive-strip points, angles between adhesive-strip edges which converge to a point are less than 35°, preferably less than 20°, with particular preference less than 15°. Curvature radii of the adhesive-strip ends are less than 0.5 mm, preferably less than 0.3 mm. The overall length of the adhesive strips is greater than approximately 20 mm, preferred lengths are from approximately 25 mm to 100 mm, although in principle greater lengths may also be used in accordance with the invention—with particular preference, they are from 30 mm to 65 mm.

The detachment rate of strippable self-adhesive tapes may be described by the separation rate of the moving grip tab, $V_A$, or by the rate of the adhesive composition detaching from the substrate, $V_{PSA}$. In the steady-state case (constant peel rate, constant adhesive-strip width and adhesive-strip thickness), both variables are proportional to one another. The proportionality constant is defined in this case by the instantaneous extension of the adhesive strip. The observed reduction in the sudden drop of the energy stored elastically in the adhesive strip (which causes catapulting) probably also occurs as a result of the fact that adhesive strips which taper in their cross-sectional area and/or in their width, owing to the equally steadily reducing detachment force in the region of the adhesive-strip tapering, exhibit a significantly lower ratio of $V_A/V_{PSA}$; i.e., at the same separation rate of the grip tab, a higher rate of the adhesive composition detaching from the substrate is established.

Apart from by integrating an adhesive-strip region which reduces in width, high detachment rates at the end of the detachment process may also be realized by means of a corresponding reduction in the adhesive-strip thickness or by means of a reduction in the bond strength in the course of the detachment process (for example, by rendering the pressure-sensitive adhesive composition inert progressively on both sides in accordance with DE 44 28 587) or by means of a combination of the aforementioned possibilities.

As a further advantage, self-adhesive tapes of the invention possess, in the end region of the adhesive strips, an outstanding capacity for tear-free and residue-free redetachment, including for redetachment from highly sensitive substrates, such as sensitive wallpapers, for example, or from substrates having a very high sticking tendency, such as metal, glass or polar plastics surfaces, for example.

The intention of the text below is to illustrate the invention with reference to exemplary drawings without, however, wishing to restrict it unnecessarily. In diagrammatic plan view.

FIGS. 2–13b: show adhesive film strips of the invention.

In detail, these figures show a grip tab 1 and an adjacent adhesive region 2, which in accordance with FIGS. 2 to 13b is divided in turn into three regions 4, 5 and 6, a first adhesive region 4, a second adhesive region 5 and a third adhesive region 6 with point(s) 7 at the end 3. To aid clarity, not every reference number has been inserted in every figure. The third adhesive region 6 runs out in one or more points 7. The first adhesive region 4 merges into the second adhesive region 5 and is labelled at its end with 8.

DETAILED DESCRIPTION

Product Structure

Adhesive film strips suitable in accordance with the invention may have a single-layer product structure in accordance with DE 33 31 016 C2 and DE 42 22 849. In accordance with the invention it is likewise possible to use adhesive film strips comprising two or more adhesive layers, for example in accordance with DE 197 08 366, including those where one or more of the adhesive layers have been foamed. Further suitable for use in accordance with the invention are adhesive film strips in accordance with DE 196 49 727, DE 196 49 728, DE 196 49 729 and WO 95/06691 which have foam-containing intermediate carriers. Likewise suitable for use in accordance with the invention are adhesive films in accordance with U.S. Pat No. 4,024,312.

Figure 1:
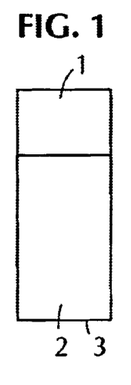
FIG. 1: shows a known adhesive film strip.
Figure 2:
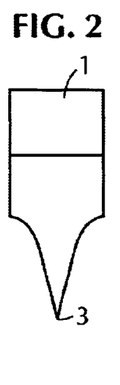
Figure 3:
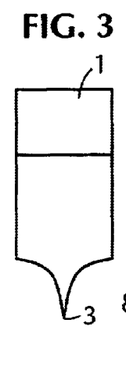
Figure 3A:
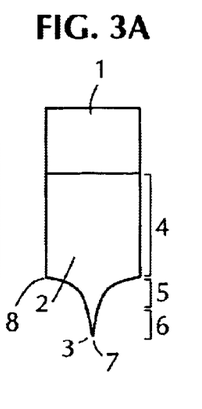
Figure 4:
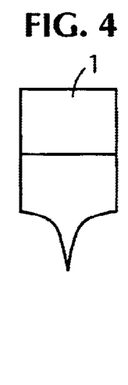
Figure 5:
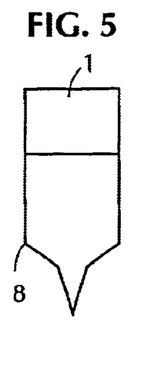
Figure 6:
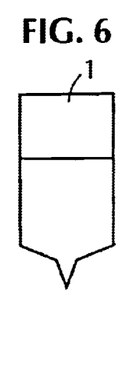
Figure 7:
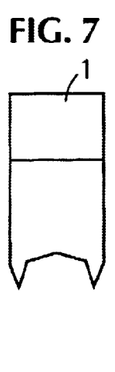
Figure 8:
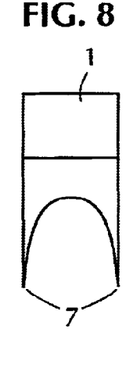
Figure 9:
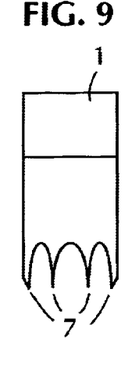
Figure 10:
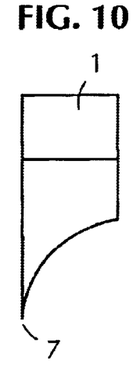
Figure 11:
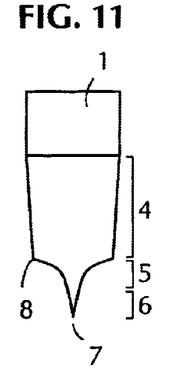
Figure 12A:
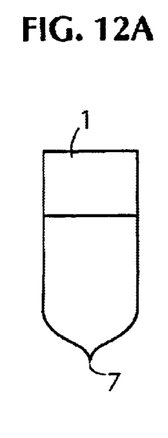
Figure 12B:
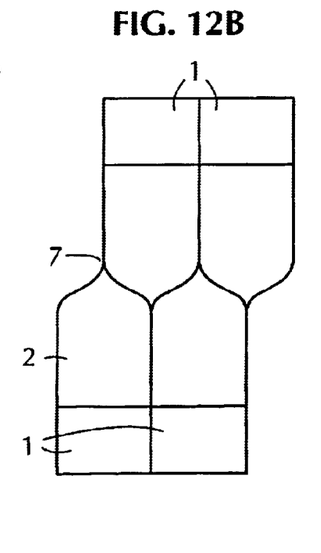
Figure 13A:
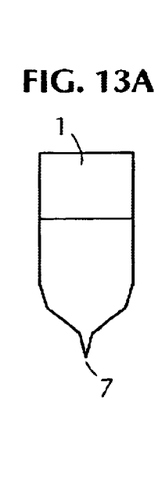
Figure 13B:
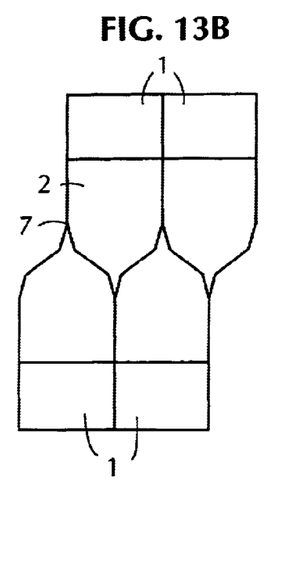

Shape Design—Combination of a Region of High Stripping Force With a Region of Low Stripping Force Preferred adhesive strip shapes, following an optional non-adhesive grip-tab region ((1) in FIG. 3a), have a first region of high cross-sectional area of the adhesive strip regions, which is preferably realized by means of a high adhesive-strip width ((2) in FIG. 3a). In one particular embodiment, the first adhesive-strip region may at the same time have a higher average total thickness than the second, highly tapering adhesive-strip region. In another particular embodiment, the first adhesive-strip region may taper slightly in width and/or thickness parallel to the detachment direction (see e.g. FIG. 11). Preferred adhesive-strip widths in the first adhesive-strip region are between approximately 8 mm and approximately 30 mm, with particular preference between approximately 10 mm and approximately 25 mm. Adhesive-strip thicknesses are on average from 400 $\mu$m to 2000 $\mu$m, preferably from 500 $\mu$m to 1250 $\mu$m. Preferred stripping forces in the first adhesive-strip region are on average greater than approximately 5 N, preferably greater than 10 N (stripping force measured for white typewriter paper {basis weight: 80 g/m$^2$} bonded to coated woodchip wallpaper; see also section headed Test Methods). Adjacent to the first adhesive-strip region of high cross-sectional area, preferably realized by means of a high adhesive-strip width, there is a second adhesive-strip region in which the cross-sectional area of the adhesive strips reduces sharply within a short distance ((3) in FIG. 3a). The reduction in the cross-sectional area of the adhesive strips is achieved in particular by means of a reduction in the adhesive-strip width. Preferably, the reduction realized in the adhesive-strip width is more than 60%, with particular preference more than 75%, within an adhesive-strip length of less than approximately 50% of the adhesive-strip width at the end of the first adhesive-strip region, preferably of less than 35% of the adhesive-strip width at the end of the first adhesive-strip region. In the region of the sharp reduction in the adhesive-strip cross-sectional area, the tapering adhesive-strip edges may be either linear (see e.g. FIGS. 5, 6, 7) or nonlinear, e.g. curved, in shape (see e.g. FIGS. 2 to 4 and 8 to 11). Adhesive-strip ends are shaped to run out to a point ((4) in FIG. 3a). One (see e.g. FIGS. 2 to 4 and 11) or more (see e.g. FIGS. 8 and 9) adhesive-strip ends which run out to a point are possible. Curvature radii of the adhesive-strip ends are less than 0.5 mm, preferably less than 0.3 mm. Within the adhesive-strip points, angles between adhesive-strip edges which run out to a point are less than 350, preferably less than 200, with particular preference less than 150. The overall length of the adhesive strip is greater than approximately 20 mm, preferred lengths are from approximately 25 mm to 100 mm, with particular preference from 30 mm to 65 mm.

Adhesive Strips with Partial Rendering-Inert of the Pressure-Sensitive Adhesive Composition Surface Adhesive strips of the invention may optionally be modified in accordance with DE 44 28 587 by rendering the pressure-sensitive adhesive regions partially inert on both sides (see Figure in Ex. 4–02). Advantages of such embodiments are the possibility of controlling the stripping forces by way of the adhesive-strip length, the possibility of utilizing relatively high curvature radii at the adhesive-strip end, and an additional reduction in catapulting tendency and catapulting forces. Preference is given to partial rendering-inert, which is performed identically, and thus congruently, on opposing adhesive-strip surfaces.

Grip-tab Regions

Preferably on the adhesive-strip end from which the detachment process is started, self-adhesive tapes of the invention comprise a non-adhesive grip-tab region (FIG. 3, 1). The non-adhesive grip-tab region may be performed in analogy to DE 42 22 849 or DE 43 39 604 or DE 196 49 636 by laminating application of thin polymer films, thin papers, or by means of printing. The latter possibility may be used with advantage in particular when at the same time the pressure-sensitive adhesive region is to be made partly non-adhering in parts of the surface by means of partial rendering-inert. If a foam-containing intermediate backing possessing tensile strength, in accordance for example with WO 95/06691, is used, then the non-adhesive grip-tab region may be formed by the intermediate backing in this region not being coated with pressure-sensitive adhesive composition.

Manufacture

Adhesive strips may be obtained by punching from roll product. Preference is given to the utilization of a punching process in accordance with DE 196 41 094, which permits very substantially waste-free production of the punched products. In this case there is the possibility of being able to punch both individual adhesive strips and groups of adhesive strips, e.g. pairs, very substantially without waste in accordance with DE 196 41 094 (see e.g. FIGS. 12 and 13).

Test Methods

Determination of catapulting force with horizontal bonding of the adhesive strips Adhesive film strips of the desired shape and size are bonded to a firmly fixed horizontal substrate (e.g. steel, chipboard coated with painted woodchip wallpaper, tiles, Resopal, etc.). For this purpose, the adhesive film samples are pressed onto the corresponding substrate by rolling over them twice using a steel roller weighing 2 kg. A strip of paper (white typewriter paper; basis weight=80 g/m$^2$) measuring 30 mm×80 mm (width×length) is bonded to the adhesive film strip in such a way that on one of its narrow sides an at least 10 mm long section of the adhesive film strip protrudes as a grippable end from the joint produced. On the opposite narrow end of the paper strip, a clip is fastened. The paper strip is subsequently pressed on by rolling over it twice with a steel roller weighing 2 kg. A spring balance, fixed firmly in its turn, is then fastened to the clip.

The catapulting force during detachment of the corresponding adhesive film strip is determined by removing the adhesive film strip from the joint at the chosen speed (e.g. 2.5 m/min, 5 m/min, 10 m/min, 20 m/min) at an angle of not more than 3° to the substrate. If there is a marked sequential detachment of the adhesive film strip at the end of the detachment process, the result is a sudden catapulting of the paper strip in the detachment direction. The force which occurs in this case is determined by means of the spring balance.

Determination of the Catapulting Tendency on
Vertical Detachment of the Adhesive Strips Adhesive film strips of the desired shape and size are bonded to a firmly fixed vertical substrate (e.g. steel, chipboard coated with painted woodchip wallpaper, tiles, Resopal, etc.) by means of applied thumb pressure. To determine the catapulting tendency, paper (white typewriter paper; basis weight: 80 g/m$^2$; size: DIN A4) is bonded to the adhesive film sample by means of applied thumb pressure so that a grippable section of the adhesive film strip of at least 10 mm in length protrudes vertically upwards out of the joint, centrally, over one narrow side of the A4 paper. The adhesive film strip is then detached by pulling and stretching vertically upwards (in the direction of the grip tab) at a defined detachment rate (e.g. 2.5 m/min, 5 m/min, 10 m/min, 20 m/min) and at an angle of not more than 3° to the bond surface. If at the end of the detachment process there is catapulting of the assembly comprising adhesive film strip and bonded paper, then a measurement is made of the height to which the assembly is accelerated. Alternatively, the catapulting tendency can be divided. qualitatively, for example, into high=3, marked =2, low=1, very low or undetectable=0. A very low or imperceptible catapulting tendency corresponds to catapulting heights of ≦approximately 10 mm, a low catapulting tendency to those between approximately 10 mm and 50 mm, and a marked catapulting tendency to those of >approximately 50 mm. If the catapulting tendency is classified as high, there is a high risk, if using thin poster paper (thickness<approximately 60 μm), of the poster tearing in the end region of the bond at the end of the detachment process. If the catapulting tendency is classified as "marked", slight fibre tears are observed in some cases when using thin poster papers (thicknesses<approximately 60 μm).

Measurement of the Stripping Force

An adhesive film strip of the desired shape and size lined on both sides with release paper is freed from the release paper on one side and subsequently bonded for 10 seconds at an applied pressure of 10 N/cm$^2$ to woodchip wallpaper painted with white emulsion paint (wallpaper: Erfurt K örnung 52; paint: Herbol Zenit LG; wallpaper fixed to chipboard). In order to achieve, as far as possible, a full-area bond, the applied pressure on the adhesive strip is mediated by a 10 mm thick foam interlayer (PU foam of density 100 kg/m$^3$). In a second processing step, the second release paper is first detached from the adhesive strip, which is then lined with white typewriter paper of basis weight 80 g/m$^2$ (dimensions: 30 mm×80 mm (width×length)) in such a way that the adhesive strip with its grip tab overhangs the narrow side of the paper strip by approximately 10 mm. The paper strip is subsequently pressed on by rolling over it twice with a steel roll weighing 2 kg. The strip force is measured at a separation rate of 1800 mm/min.

Specimen Preparation 50 parts of a 2:1 mixture of Vector 4211 (styrene-isoprene-styrene block copolymer, Dexco) and Vector 8508 (styrene-butadiene-styrene block copolymer), 50 parts of a penta ester of partially hydrogenated rosin (Foralyn 110) and 1 part of a primary antioxidant (Irganox 1010; Ciba) (Formulation 1=PSA-1) are processed in a kneading device with sigma blades at a temperature of +180° C. to give a homogeneous mixture. Alternatively, 50 parts of a 2:1 mixture of Vector 4113 (styrene-isoprene-styrene block copolymer) and Vector 2518 (styrene-butadiene-styrene block copolymer), 50 parts of Foralyn 110 and 1 part of Irganox 1010 are processed to give a homogenized mixture (Formulation 2=PSA-2). Also alternatively, 50 parts of Vector 4113 (styrene-isoprene-styrene block copolymer), 50 parts of Foralyn 110 and 1 part of Irganox 1010 are processed to form a homogeneous mixture (Formulation 3=PSA-3). After cooling, single-layer adhesive film sections of the desired thickness are produced by pressing the adhesive composition at +200° C.

EXAMPLE I

From adhesive film sections of the formulations 1 and 2 (PSA-1 and PSA-2, respectively), rectangular adhesive strips of different width and thickness are prepared, which are provided at one of their ends on both sides with 14 mm long polyester films (Hostaphan RN 23) which cover the entire width of the adhesive strips, so as to form a non-adhesive grip-tab region. In addition to the catapulting force, a measurement is made of the catapulting tendency on single-handed detachment of the adhesive strips (the bond substrate in each case being Resopal). The properties which result are as follows:

| Designation of test | Adhesive strip thickness | Adhesive strip dimensions (L × W) | Detachment rate | Catapulting force | Catapulting tendency |
|---|---|---|---|---|---|
| 1.01-PSA-2 | 680 μm | 50 mm × 5 mm | 10 m/min | 1.2 N | 3 |
| 1.02-PSA-2 | 680 μm | 50 mm × 10 mm | 10 m/min | 2.6 N | 3 |
| 1.03-PSA-2 | 680 μm | 50 mm × 15 mm | 10 m/min | 3.8 N | 3 |
| 1.04-PSA-2 | 680 μm | 50 mm × 20 mm | 10 m/min | 6.1 N | 3 |
| 1.05-PSA-2 | 500 μm | 50 mm × 10 mm | 5 m/min | 0.75 N | 3 |
| 1.06-PSA-2 | 680 μm | 50 mm × 10 mm | 5 m/min | 4.25 N | 3 |
| 1.07-PSA-2 | 750 μm | 50 mm × 10 mm | 5 m/min | 4.38 N | 3 |
| 1.08-PSA-2 | 1000 μm | 50 mm × 10 mm | 5 m/min | 7 N | 3 |
| 1.09-PSA-2 | 500 μm | 50 mm × 10 mm | 10 m/min | 0.72 N | 3 |
| 1.10-PSA-2 | 680 μm | 50 mm × 10 mm | 10 m/min | 2.3 N | 3 |
| 1.11-PSA-2 | 750 μm | 50 m m× 10 mm | 10 m/min | 2.8 N | 3 |
| 1.12-PSA-2 | 1000 μm | 50 mm × 10 mm | 10 m/min | 3.25 N | 3 |
| 1.13-PSA-2 | 500 μm | 50 mm × 10 mm | 20 m/min | 0.2 N | 2 |
| 1.14-PSA-2 | 680 μm | 50 mm × 10 mm | 20 m/min | 0.56 N | 3 |
| 1.15-PSA-2 | 750 μm | 50 mm × 10 mm | 20 m/min | 1.03 N | 3 |
| 1.16-PSA-2 | 1000 μm | 50 mm × 10 mm | 20 m/min | 1.25 N | 3 |
| 1.17-PSA-1 | 700 μm | 50 mm × 10 mm | 10 m/min | 4 N | 3 |
| 1.18-PSA-1 | 1100 μm | 50 mm × 10 mm | 10 m/min | >7 N | 3 |

*3: Catapulting tendency high, 2: marked, 1: low, 0 very low or not detectable

As expected, for a predetermined adhesive strip thickness, the catapulting force increases approximately in proportion to the width of the adhesive strips. Catapulting forces fall as the detachment rate increases. In all cases, however, including that of high detachment rates, a high or marked catapulting tendency, and significant catapulting forces, are observed.

EXAMPLE II

From adhesive film sections of formulation 2 (PSA-2), adhesive strips shaped in accordance with DE 44 28 587 are produced (II.05-PSA-2 with non-adhesive grip-tab region, other none). A measurement is made of the catapulting force and of the catapulting tendency on single-handed detachment of the adhesive strips (the bond substrate being in each case Resopal). The properties which result are as follows:

| Designation of test | Adhesive strip shape (diagrammatical); adhesive strip width | Angle of adhesive strip point//adhesive thickness | Detachment rate | Catapulting force | Catapulting tendency |
|---|---|---|---|---|---|
| II.01-PSA-2 |  | 50°//500 μm | 10 m/min | 0.12 N | 1 to 2 |
| II.02-PSA-2 |  | 70°//700 μm | 10 m/min | 0.58 N | 3 |
| II.03-PSA-2 |  10 mm | 70°//500 μm | 10 m/min | 0.17 N | 2 |
| II.04-PSA-2 |  10 mm | 80°//500 μm | 10 m/min | 0.7 N | 3 |
| II.05-PSA-2 |  20 mm | each 90°//700 μm | 10 m/min | 3.2 N | 3 |
| II.05-PSA-2 |  20 mm | 2.5 mm curvature radius//700 μm | 10 m/min | 3.5 N | 3 |
| II.06-PSA-2 |  20 mm | 10 mm curvature radius//700 μm | 10 m/min | 4.2 N | 3 |
| II.07-PSA-2 |  10 mm | 2 mm curvature radius//700 μm | 10 m/min | 0.25 N | 3 |
| II.08 | tesa ® Poster-strips; 20 mm | 2 mm curvature radius//690 μm | 2.5 m/min | 0.5 N | 3 |
| II.09 | tesa ® Poster-strips; 20 mm | 2 mm curvature radius//690 μm | 5 m/min | 0.33 N | 3 |
| II.10 | tesa ® Poster-strips; 20 mm | 2 mm curvature radius//690 μm | 10 m/min | 0.17 N | 2 |

*3: Catapulting tendency high, 2: marked, 1: low, 0 very low or not detectable In all cases, a high or marked catapulting tendency and significant catapulting forces are observed.

EXAMPLE III

Strippable adhesive strips (formulation 2 (PSA-2)) are produced which have a first pressure-sensitive adhesive region, which permits high peel strength and requires high detachment forces (stripping forces), adjacent to which there is a second pressure-sensitive adhesive region with significantly lower stripping forces. A measurement is made of the catapulting force and of the catapulting tendency on single-handed detachment of the adhesive strips (the bond substrate being in each case Resopal).

For comparison, a rectangular adhesive strip and also an adhesive strip which converges to a point and is triangular in its basic shape are tested. The properties which result are as follows:

| Designation of test | Adhesive strip shape (schematically) | Adhesive strip thickness | Detachment rate | Catapulting force | Catapulting tendency |
|---|---|---|---|---|---|
| III.01-PSA-2 |  | 680 µm// 50 × 15 mm | 5 m/min | 6.5 N | 3 |
| III.02-PSA-2 |  | 700 µm//30° | 2.5 m/min | 0.2 N | 2 |
| III.03-PSA-2 |  | 700 µm//30° | ** | <0.05 N | 0 |
| III.04-PSA-2 |  | 700 µm//30° | ** | 0.05 N | 0 |

*3: Catapulting tendency high, 2: marked, 1: low, 0 very low or not detectable
**In practical application, detachment rates of ≧10 m/min throughout occur at the end of the detachment process.

Initially, as a consequence of the high initial stripping force, adhesive strips of tests III.03 and III.04 are in practice removed comparatively carefully and slowly from the join. As a consequence of the sharply decreasing detachment forces (stripping forces) which occur in the region of the adhesive-strip tapering, however, in the second (tapering) adhesive-strip region there is a sharp acceleration of the detachment rate (stripping rate). A low stripping rate in the end region of the bond is therefore not realized in practice with correspondingly designed adhesive strips. Accordingly, adhesive strips III.03 and III.04 have extremely low catapulting forces and a very low or undetectable catapulting tendency in comparison to the rectangular and the triangular comparative specimens.

EXAMPLE IV

Double-sided adhesive strips (formulation 2 (PSA-2)) measuring 50 mm×15 mm of rectangular shape are rendered inert on both sides in identical manner (congruently) over the full area of parts of the end region of the adhesive strips. The adhesion regions are rendered inert by the fact that they taper sharply towards the adhesive-strip end. Tapering pressure-sensitive adhesive regions have angles of approximately 10° at the end of the adhesive strips. Testing is carried out in comparison with the analogous adhesive strips which have not been rendered inert. The properties which result are as follows:

| Designation of test | Adhesive strip shape (schematically) | Curvature radius adhesive-strip point//adhesive strip thickness | Detachment rate | Catapulting force | Catapulting tendency |
|---|---|---|---|---|---|
| IV.01-PSA-2 |  | —//700 mm | 10 m/min | 3.6 N | 3 |
| IV.02-PSA-2 |  | ≦0.3 mm**// 700 µm | 10 m/min | <0.1 N | 0 |

*3: Catapulting tendency high, 2: marked, 1: low, 0 very low or not detectable
**Adhesive strip corresponding to IV.01-PSA-2, but with complete rendering-inert of parts of the adhesive-strip surfaces with pressure-sensitive adhesive composition regions which converge to a point on both sides. Curvature radius of the pressure-sensitive adhesive composition regions in the adhesive-strip point.

By means of complete rendering-inert of parts of the adhesive-strip surface on both sides such that the pressure-sensitive adhesive regions converge to a point at the adhesive-strip end, it is possible to realize strippable adhesive strips which have a very low catapulting tendency in very substantial independence from the geometric adhesive-strip shape. This enables the geometry of the adhesive-strip shape to be substantially decoupled from the tendency of the adhesive strips to exhibit catapulting.

EXAMPLE V

Adhesive strips in accordance with Example III, test III.03-PSA-2, test III.04-PSA-2, and further selected adhesive-strip shapes in accordance with the invention with single-layer product structure are tested in respect of catapulting force and catapulting tendency in comparison with multilayer product structures (length of the 20 mm wide adhesive strips, including the non-adhesive grip-tab regions, was in each case 50 mm). Curvature radii of the adhesive-strip ends (adhesive-strip points) were found to be <0.3 mm. The properties which result are as follows:

| Designation of test | Adhesive strip shape (schematic); adhesive strip width | Angle of adhesive-strip point// adhesive strip thickness | Detachment rate | Catapulting force | Catapulting tendency |
|---|---|---|---|---|---|
| III.03-PSA-2 |  10 mm | 30°//700 μm | ** | <0.05 N | 0 |
| III.04-PSA-2 |  10 mm | 30°//700 μm | ** | 0.05 N | 0 |
| V.01-PSA-2 |  20 mm | 15°//700 μm | ** | <0.05 N | 0 |
| V.02-PSA-2 |  20 mm | 10°//700 μm | ** | <0.05 N | 0 |
| V.03-PSA-2 |  20 mm | each approximately 10°//700 μm | ** | 0.05 N | 0 |
| V.04-PSA-3/1/3 |  10 mm | 20°//50/600/50 μm | ** | 0.05 N | 0 |
| V.05-PSA-1/S/1 |  10 mm | 20°// 200/550/200 μm | ** | 0.08 N | 0–1 |
| V.06-PSA-1/F/1 |  10 mm | 20°// 200/600/200 μm | ** | 0.05 N | 0–1 |

-continued

| Designation of test | Adhesive strip shape (schematic); adhesive strip width | Angle of adhesive-strip point// adhesive strip thickness | Detachment rate | Catapulting force | Catapulting tendency |
|---|---|---|---|---|---|
| V.07-PSA-1/S/1 | <br>with 10 mm long foam-free end region | 20°//<br>200/550/200 μm | ** | <0.02 N | 0 |

*3: Catapulting tendency high, 2: marked, 1: low, 0 very low or not detectable
**In practical application, detachment rates of ≧ 10 m/min throughout occur at the end of the detachment process.

All single-layer adhesive strips have an undetectable catapulting tendency. Specimen V.04-PSA-3/1/3 comprises a three-layer laminate consisting of a 600 μm thick internal layer of formulation 1 provided on both sides with cover layers of formulation 3, each approximately 50 μm thick. Specimen V.05-PSA-1/S/1 comprises a 500 μm thick polyolefin foam of density 125 kg/M$^3$ (Alveolit TEE 0800.55) coated on both sides with pressure-sensitive adhesive composition of formulation 1 in a thickness of approximately 200 μm in each case. Specimen V.06-PSA-1/F/1 comprises a three-layer laminate comprising a foamed pressure-sensitive adhesive layer having an average density of 350 kg/m$^3$ of formulation 1, which is coated on both sides with adhesive composition layers of the same formulation in a thickness of approximately 225 μm. Specimen V.07-PSA-1/S/1 corresponds in its structure to specimen V.05-PSA-1/S/1, but comprises a 10 mm long foam-free end region. All of the multilayer adhesive strips have an undetectable, or undetectable to low, catapulting tendency.

What is claimed is:

1. An adhesive film strip for producing an adhesive bond to a substrate, the adhesive bond being releasable by pulling on the adhesive film strip in a direction of a plane of the adhesive bond, said adhesive film strip comprising:
   a) a grip tab region beginning at a first end of the adhesive film strip, extending towards a second end of the adhesive film strip, and terminating at a beginning of an adhesive region; and
   b) an adhesive region beginning adjacent to said grip tab region, extending to and including said second end, and terminating at said second end in at least one point, wherein said adhesive region comprises:
      i) a first adhesive region immediately adjacent to the grip tab region;
      ii) a second adhesive region beginning adjacent to the first adhesive region and extending towards the second end, wherein the second adhesive region has a cross-sectional area that is reduced within a length of the second adhesive region by more than 60% relative to the cross-sectional area of the first adhesive region at an end of the first adhesive region that adjoins the second adhesive region, said length being measured as less than 50% of a width of the end of the first adhesive region that adjoins the second adhesive region; and
      iii) a third adhesive region adjacent to the second adhesive region extending to and forming the second end, and comprising said at least one point.

2. The adhesive film strip according to claim 1, wherein the adhesive region comprises an adhesive composition on at least one side.

3. The adhesive film strip according to claim 2, wherein the adhesive region is identical on both sides.

4. The adhesive film strip according to claim 1, wherein the cross-sectional area of the second adhesive region is reduced by more than 75% relative to said cross-sectional area of said first adhesive region.

5. The adhesive film strip according to claim 1, wherein the length is less than 35% of the width of the end of the first adhesive region.

6. The adhesive film strip according to claim 1, wherein a thickness of the second and third adhesive regions is less than that of the first adhesive region, and wherein the thickness decreases by Fore than 20% at the second end of the adhesive film strip relative to the first adhesive region.

7. The adhesive film strip according to claim 1, wherein the thickness of the second and third regions decreases continuously towards the second end of the adhesive film strip.

8. The adhesive film strip according to claim 1, further comprises edges of the adhesive film trip which converge to form said at least point, wherein the at least one point converge at an angle less than 35°.

9. The adhesive film strip according to claim 8, wherein the angle is less than 20°.

10. The adhesive film strip according to claim 1, which has an overall length of at least 20 mm nd a width of the first adhesive region of 8–30 mm.

11. The adhesive film strip according to claim 10, which has an overall length of 25–100 mm and a width of the first adhesive region of 10–25 mm.

12. The adhesive film strip according to claim 1, which exhibits a stripping force in the first adhesive region of at least 5 N, and a stripping force in the second adhesive region which is less than that of the first adhesive region, and a catapulting force in the third adhesive region of less than 0.1 N.

13. The adhesive film strip according to claim 12, wherein the stripping force in the first adhesive region is at least 10 N.

14. A method of forming and subsequently releasing an adhesive bond, said method comprising adhering an adhesive film strip according to claim 1 to a substrate and subsequently releasing said adhesive bond by detaching said film strip from said substrate by pulling on said adhesive film strip in a direction of a plane of the adhesive bond at a constant removal rate, wherein a detachment rate is higher at an end of the releasing than at a beginning of the releasing.

15. A method for producing a catapult-free release of an adhesive film strip from a substrate to which it is bonded, said method comprising providing an adhesive film strip according to claim 1 bonded a substrate, and pulling on said adhesive film strip in a direction of a bond plane of an adhesive bond formed between said adhesive film strip and said substrate.

* * * * *

UNITED STATES PATENT AND TRADEMARK OFFICE
CERTIFICATE OF CORRECTION

PATENT NO. : 6,680,096 B1
DATED : January 20, 2004
INVENTOR(S) : Luhmann et al.

It is certified that error appears in the above-identified patent and that said Letters Patent is hereby corrected as shown below:

Column 7,
Line 57, "less than 350" should read -- less than 35° --
Line 58, "200, with particular preference less than 150" should read -- 20°, with particular preference less than 15° --

Column 9,
Line 21, "divided. qualitatively" should read -- divided qualitatively --

Column 18,
Line 27, "decrcases by Fore" should read -- decreases by more --
Line 33, "film trip" should read -- film strip --
Line 39, "nd a width" should read -- and a width --

Signed and Sealed this

Twenty-third Day of November, 2004

JON W. DUDAS
*Director of the United States Patent and Trademark Office*